United States Patent
Ahn et al.

(10) Patent No.: US 7,675,989 B2
(45) Date of Patent: Mar. 9, 2010

(54) METHOD AND APPARATUS FOR UPLINK CARRIER FREQUENCY SYNCHRONIZATION AND ANTENNA WEIGHT VECTOR ESTIMATION IN OFDMA SYSTEM HAVING SMART ANTENNA

(75) Inventors: Jae-Young Ahn, Daejon (KR);
Yong-Soo Cho, Seoul (KR); Dong-Han Kim, Chungcheongnam-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 846 days.

(21) Appl. No.: 11/303,484

(22) Filed: Dec. 16, 2005

(65) Prior Publication Data
US 2006/0233270 A1     Oct. 19, 2006

(30) Foreign Application Priority Data
Mar. 25, 2005   (KR) .................. 10-2005-0024801

(51) Int. Cl.
*H04B 7/02*     (2006.01)

(52) U.S. Cl. .................. 375/267; 375/135; 375/260; 375/316; 375/346; 455/84; 455/63.1; 455/450; 370/210; 370/329

(58) Field of Classification Search ............... 375/130, 375/135–136, 144, 147–148, 259, 260, 267, 375/316, 342–343, 346–347, 349, 354, 355, 375/358; 370/203, 208, 210, 329; 455/63.1, 455/67.11, 84, 450
See application file for complete search history.

(56) References Cited

U.S. PATENT DOCUMENTS 6,650,714 B2     11/2003  Dogan et al.

(Continued)

FOREIGN PATENT DOCUMENTS

KR       1020020096755 A     12/2002

(Continued)

OTHER PUBLICATIONS

Song Shi et al, "Frame Timing Detection by an MMSE Adaptive Array for Multipath OFDM Signals," The 13*th* IEEE International Symposium on Personal, Indoor and Mobile Radio Communications, Sep. 2002.

(Continued)

*Primary Examiner*—Shuwang Liu
*Assistant Examiner*—Hirdepal Singh
(74) *Attorney, Agent, or Firm*—Ladas & Parry LLP

(57) ABSTRACT

An apparatus for estimating an antenna weight vector in an Orthogonal Frequency Division Multiple Access System (OFDMA) having a smart antenna. The apparatus includes receiving and storing training symbols in the time domain transmitted to estimate an antenna weight vector during a training symbol transmission interval; estimating carrier frequency offsets using training symbols in the frequency domain that are obtained by performing a Fast Fourier Transformation (FFT) algorithm with respect to the training symbols received during the training symbol transmission interval; compensating the stored training symbols in the time domain based on the estimated carrier frequency offsets; and estimating an antenna weight vector using training symbols in the frequency domain that are obtained by applying an FFT algorithm with respect to the training symbols in the time domain derived by compensating the carrier frequency offsets during the training symbol transmission interval.

9 Claims, 10 Drawing Sheets

U.S. PATENT DOCUMENTS

| | | |
|---|---|---|
| 7,242,720 B2 * | 7/2007 | Sugiyama et al. ............ 375/260 |
| 7,423,961 B2 * | 9/2008 | Ogawa et al. ................ 370/210 |
| 7,515,657 B1 * | 4/2009 | Lee et al. ..................... 375/326 |
| 2004/0042385 A1 * | 3/2004 | Kim et al. .................... 370/203 |
| 2004/0190438 A1 | 9/2004 | Maltsev et al. |
| 2005/0041693 A1 | 2/2005 | Priotti |
| 2005/0101264 A1 * | 5/2005 | Farlow et al. ................. 455/84 |
| 2005/0141658 A1 * | 6/2005 | Tanaka et al. ............... 375/346 |
| 2007/0147545 A1 * | 6/2007 | Doi ............................. 375/316 |
| 2008/0039107 A1 * | 2/2008 | Ma et al. ..................... 455/450 |
| 2008/0304446 A1 * | 12/2008 | Kimura et al. .............. 370/329 |

FOREIGN PATENT DOCUMENTS

| KR | 1020040066400 A | 7/2004 |
|---|---|---|
| KR | 1020050002207 A | 1/2005 |

OTHER PUBLICATIONS

Jan-Jaap van de Beek et al, "A Time and Frequency Synchronization Scheme for Multiuser OFDM," IEEE Journal on Selected Areas in Communications, vol. 17, No. 11, Nov. 1999, 1900-1914.

* cited by examiner ion and antenna weight vector estimation in an OFDMA system having a smart antenna, for estimating an antenna weight vector after estimating and compensating carrier frequency offsets with respect to a desired terminal without an interference of other terminal signals, even in case where a plurality of terminals with different carrier frequency offsets transmit training symbols to estimate an antenna coefficient via a same band simultaneously, in use of Space Division Multiple Access (SDMA) to increase a transmission capacity in the ODFMA having the smart antenna.

METHOD AND APPARATUS FOR UPLINK CARRIER FREQUENCY SYNCHRONIZATION AND ANTENNA WEIGHT VECTOR ESTIMATION IN OFDMA SYSTEM HAVING SMART ANTENNA

FIELD OF THE INVENTION

The present invention relates to a method and apparatus for uplink carrier frequency synchronization and antenna weight vector estimation in an Orthogonal Frequency Division Multiplexing Access (OFDMA) system having a smart antenna. More particularly, the invention is directed to a method and apparatus for uplink carrier frequency synchronization and antenna weight vector estimation in an OFDMA system having a smart antenna, for estimating an antenna weight vector after estimating and compensating, at a base station, carrier frequency offsets existing between the base station and a terminal using training symbols transmitted to compute the antenna weight vector without a transmission of an extra periodic synchronization symbol in the OFDMA system having the smart antenna, or for estimating an antenna weight vector after estimating and compensating carrier frequency offsets with respect to a desired terminal without an interference of other terminal signals, even in case where a plurality of terminals with different carrier frequency offsets transmit training symbols to estimate an antenna coefficient via a same band simultaneously, in use of Space Division Multiple Access (SDMA) to increase a transmission capacity in the ODFMA having the smart antenna.

DESCRIPTION OF RELATED ART

Generally, OFDMA system is advantageous in that it can prevent interference between symbols that abruptly increases during a high speed data transmission by a multiple carrier communication system using orthogonal subcarriers, easily compensate frequency-selective fading channels by a simple single tap equalizer, and may be implemented at a high speed using Fast Fourier Transform (FFT). Due to the above advantages, the OFDMA system has been adopted as transmission system in variety of high speed data transmission systems in recent years. This OFDMA system is a system that assigns subcarriers over a whole band according to a transmission rate required by a plurality of users through the use of an orthogonal frequency division multiplexing scheme.

In the meantime, a smart antenna system typically forms beams into desired terminal signals with respect to a multiplicity of terminals, while forming nulls into undesired terminal signals. Therefore, such a system can demodulate the desired terminal signals without any interference although plural terminals within a same cell or adjacent cells transmit signals using a same band. This leads to various merits such as an increase in a signal to noise ratio, an expansion of service coverage, a capacity increase of a base station, etc.

In an OFDMA system with a smart antenna, a beamforming process starts by transmitting a training symbol for estimation of an antenna weight vector from a terminal to a base station via an uplink. Then, the base station estimates the antenna weight vector in the time domain using received training symbols or in the frequency domain after performing an FFT algorithm. In the antenna weight vector estimation process of OFDMA system with the smart antenna, if carrier frequency offsets exist in training symbols, the performance of antenna weight vector estimation that is carried out in the time or frequency domain is degraded owing to an increase of noise by interference between subchannels and distortions of training symbols by phase rotation, and so on.

Therefore, the exiting smart antenna system estimates and compensates carrier frequency offsets of a terminal by transmitting a synchronization symbol and doing an uplink synchronization prior to estimating an antenna weight vector to reduce the degradation of performance by carrier frequency offsets that exist between the base station and the terminal. This carrier synchronization method of the existing smart antenna system provides a feedback loop that allows the base station to estimate carrier frequency offsets using a received synchronization symbol and the terminal to compensate the carrier frequency offsets using the estimated values received via a downlink control channel. This causes a prolonged time in doing the uplink carrier frequency synchronization. Further, the carrier frequency offsets existing between the base station and the terminal moving within a cell during the process as set forth above vary depending upon the progress of time by Doppler frequency shift, which needs to conduct the carrier frequency synchronization by transmitting the synchronization symbol periodically.

On the other hand, as one of the prior art methods for solving the problems as indicated above in an OFDMA having a single antenna, there is a method that estimates carrier frequency offsets using a synchronization symbol via a base station that receives the synchronization symbol on an uplink of the OFDMA having the single antenna where a plurality of terminals transmit signals via different bands and makes use of the estimated carrier frequency offsets with respect to uplink symbols received after that.

That is to say, the base station estimates carrier frequency offsets of each terminal and compensates, in the time or frequency domain, carrier frequency offsets of terminal signals received after that. The time domain compensation method compensates a phase rotational amount by a carrier frequency offset of each terminal signal that exists in received signals in the time domain by using the estimated carrier frequency offsets. However, such method may cause multiple users interference in the frequency domain due to an increase of carrier frequency offsets existing in other terminal signals transmitted via other bands during the compensation process. Meanwhile, the frequency domain compensation method is a method for compensating distortions occurred in signals received after an FFT algorithm through a circular convolution using a function determined by the estimated carrier frequency offsets. However, this method cannot compensate influence by interference between subcarriers.

These two prior art methods are applied to the OFDMA system having the single antenna, rather than the smart antenna; and therefore, are not adapted to the OFDMA system having the smart antenna to which the present invention is applied.

SUMMARY OF THE INVENTION

It is, therefore, a primary object of the present invention to provide a method and apparatus for uplink carrier frequency synchronization and antenna weight vector estimation in an OFDMA system having a smart antenna, for estimating an antenna weight vector after estimating and compensating, at a base station, carrier frequency offsets existing between the base station and a terminal using training symbols transmitted to compute the antenna weight vector without an extra periodic synchronization symbol transmission in the OFDMA system having the smart antenna.

Another object of the present invention is to provide a method and apparatus for uplink carrier frequency synchronization and antenna weight vector estimation in an OFDMA system having a smart antenna, for estimating an antenna weight vector after estimating and compensating carrier frequency offsets with respect to a desired terminal without an interference of other terminal signals, even in case where a plurality of terminals with different carrier frequency offsets transmit training symbols to estimate an antenna coefficient via a same band simultaneously, in use of an SDMA to increase a transmission capacity in the ODFMA having the smart antenna.

In accordance with one aspect of the present invention, there is provided a method for uplink carrier frequency synchronization and antenna weight vector estimation in an Orthogonal Frequency Division Multiple Access (OFDMA) system having a smart antenna, the method comprising the steps of: a) receiving and storing training symbols in the time domain transmitted to estimate an antenna weight vector during a training symbol transmission interval; b) estimating carrier frequency offsets using training symbols in the frequency domain that are obtained by performing a Fast Fourier Transformation (FFT) algorithm with respect to the training symbols received during the training symbol transmission interval; c) compensating the stored training symbols in the time domain based on the estimated carrier frequency offsets; and d) estimating an antenna weight vector using training symbols in the frequency domain that are obtained by applying an FFT algorithm with respect to the training symbols in the time domain derived by compensating the carrier frequency offsets during the training symbol transmission interval.

In accordance with another aspect of the present invention, there is provided a method for uplink carrier frequency synchronization and antenna weight vector estimation in an OFDMA system having a smart antenna, the method comprising the steps of: a) estimating carrier frequency offsets using training symbols in the frequency domain that are obtained by applying an FFT algorithm with respect to training symbols received during two slots within a training symbol transmission interval; b) compensating carrier frequency offsets of training symbols in the time domain received after the two slots based on the estimated carrier frequency offsets; c) estimating an antenna weight vector using the training symbols in the frequency domain that are obtained by performing an FFT algorithm with respect to training symbols in the time domain derived by compensating the carrier frequency offsets; and d) repeatedly performing said steps a) to c) during the transmission of the training symbols.

In accordance with still another aspect of the present invention, there is provided a method for uplink carrier frequency synchronization and antenna weight vector estimation in an OFDMA system having a smart antenna, the method comprising the steps of: a) receiving and storing training symbols in the time domain transmitted to estimate an antenna weight vector during a part of a training symbol transmission interval; b) estimating carrier frequency offsets using training symbols in the frequency domain that are obtained by performing an FFT algorithm with respect to the training symbols received during the part of training symbol transmission interval; c) compensating carrier frequency offsets of the stored training symbols in the time domain based on the carrier frequency offsets estimated at said step b); d) estimating an antenna weight vector using training symbols in the frequency domain that are obtained by using an FFT algorithm with respect to the training symbols in the time domain derived by compensating the carrier frequency offsets at said step c) during the part of training symbol transmission interval; e) estimating carrier frequency offsets using training symbols in the frequency domain that are obtained by performing an FFT algorithm with respect to training symbols received during two slots within the training symbol transmission interval; f) compensating carrier frequency offsets of training symbols in the time domain received after the two slots based on the carrier frequency offsets estimated at said step e); g) estimating an antenna weight vector using training symbols in the frequency domain that are obtained by carrying out an FFT algorithm with respect to the training symbols in the time domain compensated at said step f); and h) repeatedly performing said steps e) to g) during the residual training symbol transmission interval.

In accordance with still yet another aspect of the present invention, there is provided an apparatus for uplink carrier frequency synchronization and antenna weight vector estimation in an OFDMA system having a smart antenna, the apparatus comprising: a training symbol storing means for receiving and storing training symbols in the time domain transmitted from a terminal to estimate an antenna weight vector during a training symbol transmission interval; a carrier frequency offset estimation means for estimating carrier frequency offsets using training symbols in the frequency domain that are obtained by performing, at an FFT means, an FFT with respect to training symbols received during the training symbol transmission interval; a carrier frequency offset compensation means for compensating carrier frequency offsets of the training symbols in the time domain stored in the training symbol storing means based on the carrier frequency offsets estimated at the carrier frequency offset estimation means; the FFT means for performing an FFT algorithm with respect to the training symbols received during the training symbol transmission interval and the training symbols in the time domain compensated at the carrier frequency offset compensation means; and an antenna weight vector estimating means for estimating an antenna weight vector using the training symbol in the frequency domain that are obtained by performing an FFT algorithm with respect to the training symbols in the time domain compensated at the carrier frequency offset compensation means during the training symbol transmission interval.

In accordance with still yet another aspect of the present invention, there is provided an apparatus for uplink carrier frequency synchronization and antenna weight vector estimation in an OFDMA system having a smart antenna, the apparatus comprising: a carrier frequency offset estimation means for estimating carrier frequency offsets using training symbols in the frequency domain that are derived by performing, at an FFT means, an FFT with respect to training symbols received during two slots within a training symbol transmission interval; a carrier frequency offset compensation means for compensating carrier frequency offsets of training symbols in the time domain received after the two slots based on the carrier frequency offsets estimated at the carrier frequency offset estimation means; the FFT means for performing an FFT algorithm with respect to the training symbols in the time domain compensated at the carrier frequency offset compensation means; an antenna weight vector estimation means for estimating an antenna weight vector using the training symbols in the frequency domain obtained at the FFT means; and means for repeatedly performing the carrier frequency offset estimation means, the carrier frequency offset compensation means, the FFT means, and the antenna weight vector estimation means during the transmission interval of the training symbols.

The other objectives and advantages of the invention will be understood by the following description and will also be appreciated by the embodiments of the invention more clearly. Further, the objectives and advantages of the invention will readily be seen that they can be realized by the means and its combination specified in the claims.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

The above-mentioned objectives, features, and advantages will be more apparent by the following detailed description in association with the accompanying drawings; and based on the foregoing, the technical spirit of the invention will be readily conceived by those skilled in the art to which the invention belongs. Further, in the following description, well-known arts will not be described in detail if it appears that they could obscure the invention in unnecessary detail. Hereinafter, a preferred embodiment of the present invention will be set forth in detail with reference to the accompanying drawings.

Figure 1:
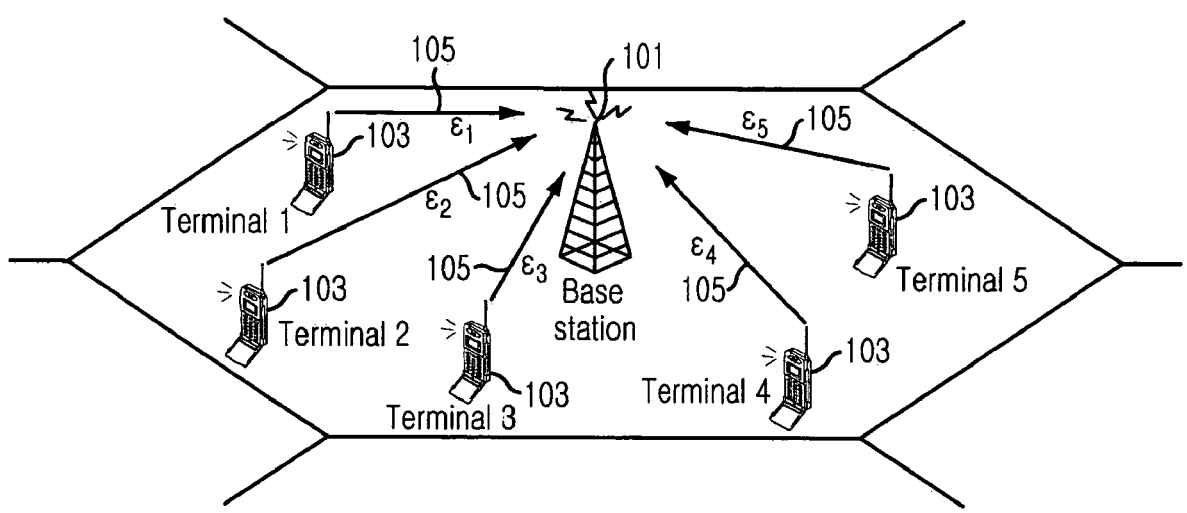
FIG. 1 is a view showing a plurality of terminals with different carrier frequency offsets that exist in one base station and cells covered by that base station, in a cellular system to which the present invention is applied.

FIG. 1 is a view showing a multiplicity of terminals with different carrier frequency offsets that are present in one base station and within a cell covered by the base station, in a cellular system to which the present invention is applied.

As shown in FIG. 1, a plurality of terminals 103 exist within a cell 102 covered by one base station 101. The base station 101 transmits signals to all the terminals 103 within the cell 102 via downlinks; and the terminals 103 transmit signals to the base station 101 via uplinks assigned to each terminal 103 by the base station 101. In this structure, a different carrier frequency offset $\epsilon_m$ 105 with respect to each terminal raises between each terminal 103 and the base station 101 owing to an unstable of oscillator and Doppler frequency transition by mobility of each terminal. Further, the performance of system is degraded because the base station 101 receives signals distorted by such carrier frequency offsets via a same band or adjacent band.

Figure 2A:
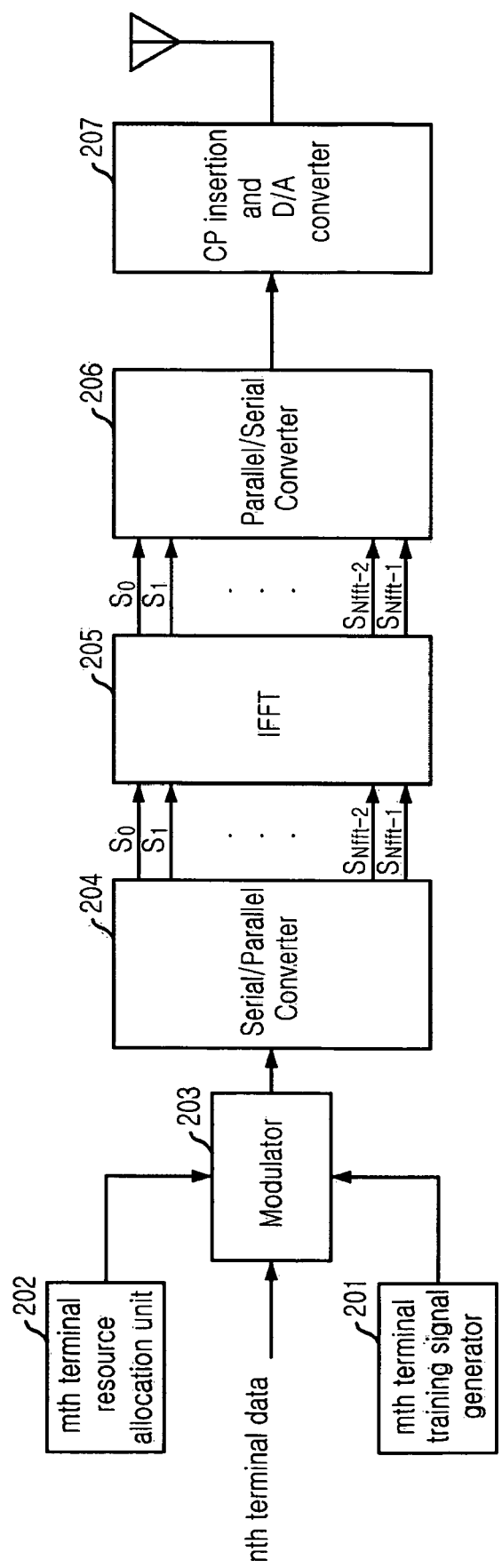
FIG. 2a is a view showing a transmission end structure of a terminal in an OFDMA system having a smart antenna to which the present invention is applied.

FIG. 2a is a view showing a transmission end structure of each terminal in an OFDMA system having a single smart antenna to which the present invention is applied.

As shown in FIG. 2a, the terminal transmission apparatus comprises a modulator 203 for receiving and modulating resource allocation particulars assigned by a resource allocation unit 202 of a specific terminal, a training signal (symbol) generated by a training signal generator 201 of the specific terminal and data from the specific terminal, a serial/parallel converter 204 for converting a serial signal modulated by the modulator 203 into a parallel signal, an Inverse Fast Fourier Transform (IFFT) unit 205 for performing an IFFT algorithm with respect to the parallel signal converted by the serial/parallel converter 204, a parallel/serial converter 206 for converting the parallel signal transformed by the IFFT unit 205 back into a serial signal, and a cyclic prefix (CP) insertion and digital/analog (D/A) converter 207 for inserting CP into the digital signal converted from the parallel/serial converter 206 and converting it into an analog signal to send the same via an antenna. Since this transmission apparatus structure is well known in the art, details thereof are omitted here for the sake of simplicity.

Figure 2B:
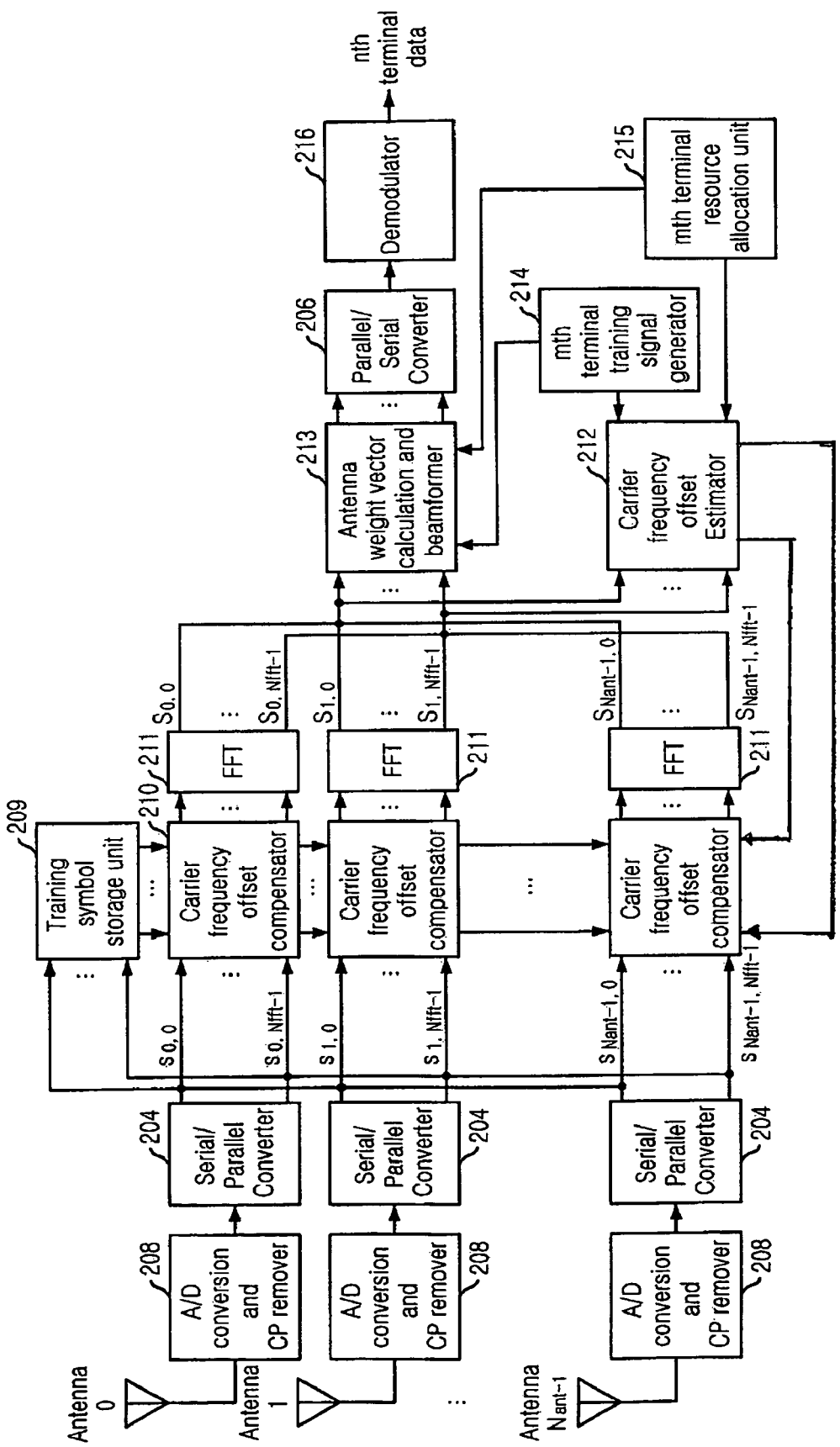
FIG. 2b is a view showing a reception end structure of a base station in an OFDMA system having a smart antenna to which the present invention is applied.

FIG. 2b is a view showing a reception end structure of a base station in an OFDMA system having smart antennas to which the present invention is applied, wherein the number of the antennas is $N_{ant}$.

As shown therein, the base station reception apparatus comprises a plurality of A/D conversion and CP removers 208 for receiving and converting an analog signal from each terminal within a specific cell via each antenna into a digital signal and removing CP from each converted signal, respectively, a multiplicity of serial/parallel converters 204 for converting a serial signal CP-removed by the A/D conversion and CP removers 208 into a parallel signal, respectively, a training symbol storage unit 209 for storing training symbols from the serial/parallel converters 204, a plurality of carrier frequency offset compensators 210 for compensating carrier frequency offsets with respect to the training symbols from the training symbol storage unit 209 based on a carrier frequency offset estimation result from a carrier frequency offset estimator 212, respectively, a plurality of Fast Fourier Transform (FFT) units 211 for conducting an FFT algorithm with respect to the carrier frequency offsets compensated by the carrier frequency offset compensators 210, respectively, the carrier frequency offset estimator 212 for receiving resource allocation particulars assigned by a resource allocation unit 215 of a specific terminal, training signals (symbols) generated by a training signal generator 214 of the specific terminal, and signals transformed from the FFT units 211, and estimating carrier frequency offsets to provide them to the carrier frequency offset compensators 210, an antenna weight vector calculation and beamformer 213 for receiving the resource allocation particulars assigned by the resource allocation unit 215 of the specific terminal, the training signals (symbols) generated by the training signal generator 214 of the specific terminal, and signals transformed from the FFT units 211, and computing or estimating an antenna weight vector and forming an antenna beam, a parallel/serial converter 206 for converting the parallel signal from the antenna weight vector calculation and beam former 213 back into a serial signal, and a demodulator 216 for demodulating the signal from the parallel/serial converter 206 to recovery data from the specific terminal.

Among the elements of this base station reception apparatus as set forth above, the important elements associated with the apparatus for uplink carrier frequency synchronization and antenna weight vector estimation according to the invention are as follows: the carrier frequency offset estimator 212, the carrier frequency offset compensator 210, the training symbol storage unit 209, the FFT unit 211, the antenna weight vector calculation and beamformer 213, and so on.

Now, an embodiment of the apparatus for uplink carrier frequency synchronization and antenna weight vector estimation according to the invention will be given in detail below. The inventive apparatus comprises a training symbol storage unit 209 for receiving and storing training symbols in the time domain transmitted from a terminal to compute or estimate an antenna weight vector during a training symbol transmission interval, a carrier frequency offset estimator 212 for estimating carrier frequency offsets using training symbols in the frequency domain that are obtained by carrying out, at an FFT unit 211, an FFT algorithm with respect to the training symbols received during the training symbol transmission interval, a carrier frequency offset compensator 210 for compensating the carrier frequency offsets of the training symbols in the time domain stored in the training symbol storage unit 209 based on the carrier frequency offsets estimated by the carrier frequency offset estimator 212, the FFT unit 211 for taking the FFT algorithm with respect to the training symbols received during the training symbol transmission interval and the training symbols in the time domain compensated by the frequency offset compensator 210, and an antenna weight vector calculator or estimator 213 for calculating or estimating an antenna weight vector using the training symbols in the frequency domain that are derived by performing, at the FFT unit 211, the FFT algorithm with respect to the training symbols in the time domain compensated by the carrier frequency offset compensator 210 during the training symbol transmission interval.

Another embodiment of the apparatus for uplink carrier frequency synchronization and antenna weight vector estimation according to the invention is set forth below. Specifically, the apparatus according to another embodiment of the invention comprises a carrier frequency offset estimator 212 for estimating carrier frequency offsets using training symbols in the frequency domain that are resulted by performing, at an FFT unit 211, an FFT algorithm with respect to training symbols received during two slots within a training symbol transmission interval, a carrier frequency offset compensator 210 for compensating carrier frequency offsets of training symbols in the time domain received after the two slots based on the carrier frequency offsets estimated by the carrier frequency offset estimator 212, the FFT unit 211 for performing the FFT algorithm with respect to the training symbols in the time domain compensated by the carrier frequency offset compensator 210, an antenna weight vector estimator 213 for computing or estimating an antenna weight vector using the training symbols in the frequency domain provided by the FFT unit 211, and means for repeatedly carrying out the operations in the carrier frequency offset estimator 212, the carrier frequency offset compensator 210, the FFT unit 211, and the antenna weight vector calculator or estimator 213 during the transmission of the training symbol.

Details of the two apparatuses as set forth above will be given later referring to FIGS. 4 to 6. The other elements shown in FIGS. 2a and 2b are well known in the art; and therefore, a further explanation therefor is not presented.

As mentioned above, the apparatus to which the present invention performs the IFFT algorithm at the transmission end, while taking the FFT algorithm with respect to each antenna at the receiving end, as in a general OFDMA or OFDM system employing a smart antenna.

At the reception end, channels experienced by subcarriers after the FFT unit 211 with respect to each antenna are allowed to do a modeling in frequency-nonselective fading with no interference therebetween.

Figure 3A:
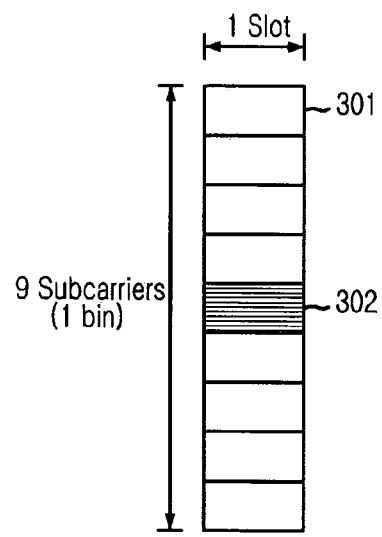
FIG. 3a is a view showing a bin used as a basic resource structure in an OFDMA system having a smart antenna to which the present invention is applied.

FIG. 3a is a view showing a bin as a basic resource structure utilized in an OFDMA system having a smart antenna to which the present invention is applied.

A portion 302 indicated by several straight lines in FIG. 3a represents a pilot subcarrier that has been already known to the reception end; and other portions 301 indicate subcarriers for transmission of data and training symbol.

Further, one resource, which is shown in FIG. 3a as an example, is constituted by 9 subcarriers. In the present invention, one resource composed of a multiplicity of subcarriers is called "bin." Each user is allowed to use more than one bin.

Figure 3B:
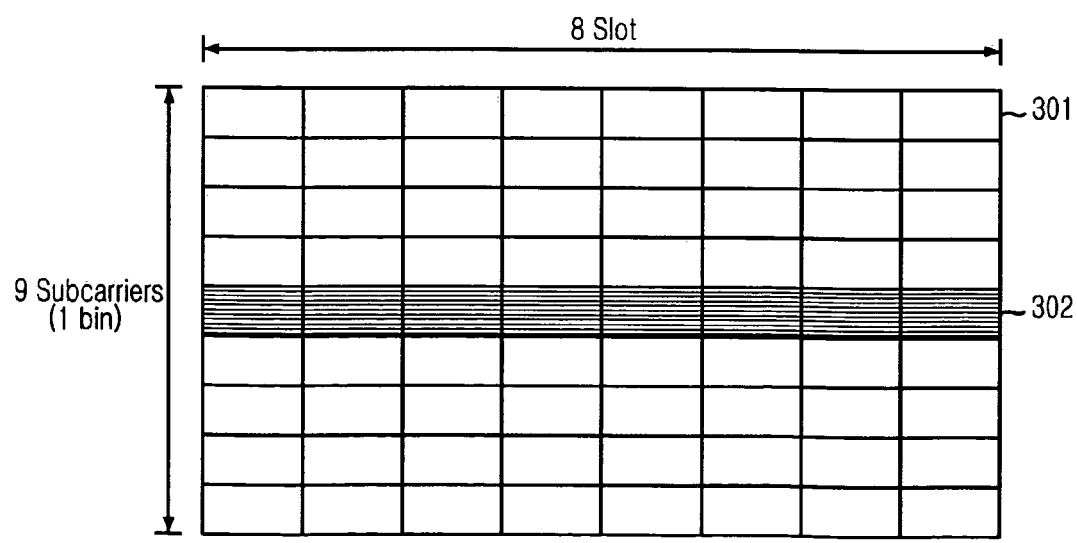
FIG. 3b is a view showing an example of assigning resources to transmit training symbols used in computing an antenna weight vector in an OFDMA system having a smart antenna to which the present invention is applied.

FIG. 3b is a view showing one example of assigning resources to transmit a training symbol used in the process of computing an antenna weight vector in an OFDMA system having a smart antenna to which the present invention is applied, wherein one example of configuring regions is introduced to transmit the training symbol using such bins.

The number of bins that are assigned for transmission of the training symbol may vary depending on the number of antennas and the performance of required beamforming.

To prevent the deterioration of performance due to a decrease in training symbols, typically, the size of regions for the transmission of training symbols needs to be determined such that the number of training symbols has at least twice that of antennas. Hereinafter, there will be given a method for uplink carrier frequency synchronization and antenna weight vector estimation, which makes use of total 64 Binary Phase Shift Keying (BPSK) or Quadrature Phase Shift Keying (QPSK) symbols as training symbols during 8 slots with respect to one bin.

Figure 4A:
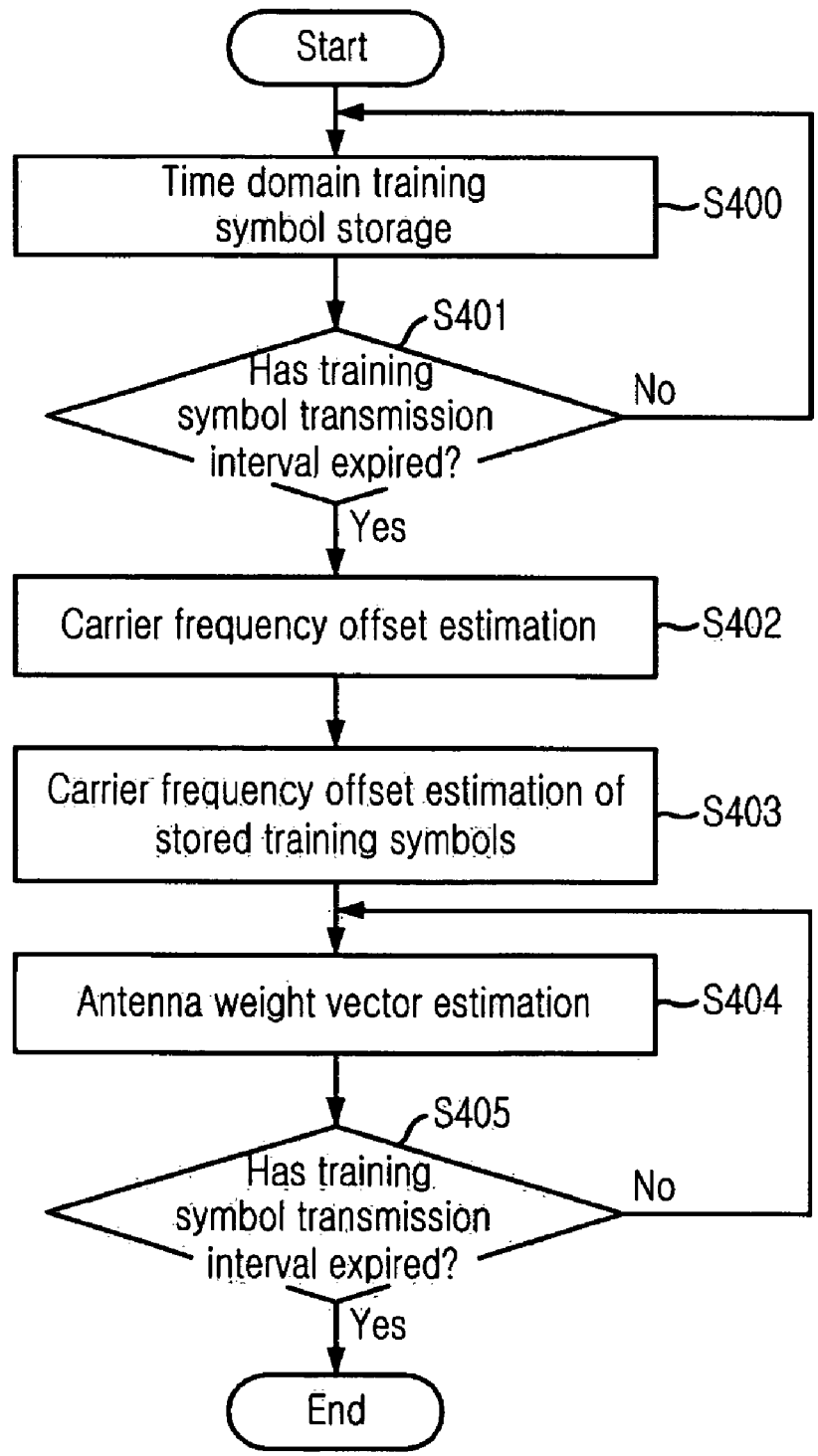
FIG. 4a is a flowchart showing a method for uplink carrier frequency synchronization and antenna weight vector estimation in an OFDMA system having a smart antenna in accordance with one embodiment of the present invention.
Figure 4B:
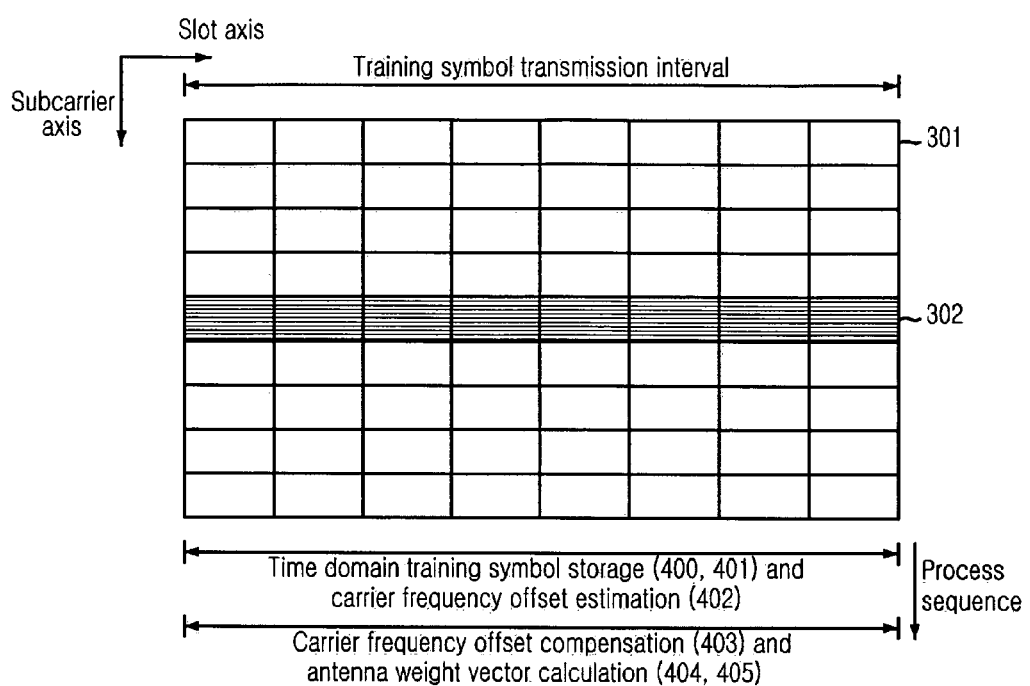
FIG. 4b is a view for explaining an example of a process sequence of a method for uplink carrier frequency synchronization and antenna weight vector estimation in an OFDMA system having a smart antenna in accordance with one embodiment of the present invention.

FIG. 4a is a flowchart showing a method for uplink carrier frequency synchronization and antenna weight vector estimation in an OFDMA system having a smart antenna in accordance with one embodiment of the present invention, and FIG. 4b is a view for explaining an example of a process sequence of a method for uplink carrier frequency synchronization and antenna weight vector estimation in an OFDMA system having a smart antenna in accordance with one embodiment of the present invention.

Firstly, at steps S400 and S401, the base station receives and stores, during a training symbol transmission interval, training symbols in the time domain transmitted from a terminal to calculate an antenna weight vector. That is, the base station stores the training symbols in the time domain received via the smart antenna to compute the antenna weight vector during the training symbol transmission interval with a plurality of time slots and bins.

At a next step S402, the inventive process estimates carrier frequency offsets using training symbols in the frequency domain that are created by doing FFT algorithm with respect to signals (training symbols) received during the training symbol transmission interval. In other words, the process estimates carrier frequency offsets using training symbols in the frequency domain that are obtained by taking an FFT algorithm with respect to training symbols in the time domain transmitted from the terminal during the training symbol transmission interval.

Subsequently, the process compensates carrier frequency offsets in the time domain, which exists in the stored training symbols in the time domain. Namely, the process compensates, at step S403, the carrier frequency offsets in the time domain of the stored training symbols in the time domain, using the estimated carrier frequency offsets. To be more specific, the process compensates the carrier frequency offsets in the time domain, which present in the training symbols in the time domain stored in the training symbol storage unit 209, using the estimated carrier frequency offsets.

At following steps S404 and S405, the process estimates or computes an antenna weight vector using training symbols in the frequency domain that are derived by carrying out the FFT algorithm with respect to the training symbols in the time domain obtained by compensating the carrier frequency offsets.

A more concrete explanation of the embodiment of each step as noted above will be set forth below.

First of all, the storing steps S400 and S401 store, in the training symbol storage unit 209, the training symbols in the time domain received via $N_{ant}$ antennas of the base station during the training symbol transmission interval.

Thereafter, the carrier frequency offset estimating step S402 using the training symbols in the frequency domain estimates the carrier frequency offsets with respect to the training symbols in the frequency domain that are obtained by performing, at the FFT unit 211, the FFT algorithm with respect to the signals that are received and stored during the training symbol transmission interval, and the already-known training symbols by using the following equation 1:

$$\hat{\varepsilon}_m = \frac{1}{2\pi(1+N_G/N)} \arg\left( \sum_{l=0}^{L-2}\sum_{k=0}^{K-1} P_{m,l,k}^H \cdot P_{m,l+1,k} \right) \quad \text{Eq. (1)}$$

Wherein $\hat{\varepsilon}_m$ is an estimated carrier frequency offset of an mth terminal; K is the number of subcarriers assigned to one bin; L is a slot number of bin assigned for antenna vector calculation; N is a size of the FFT unit; and $N_G$ represents a size of guard interval. And, $P_{m,l,k}=[P_{m,l,k}(0)\ P_{m,l,k}(1)\ \ldots\ P_{m,l,k}(N_{ant}-1)]^T$ is a cross correlation vector at subcarrier k and time slot l within a bin assigned for calculation of the antenna weight vector of the mth terminal, and may be rewritten as $P_{m,l,k}=X_{m,l,k}Y_{l,k}$. Further, $Y_{l,k}=[Y_{l,k}(0)Y_{l,k}(1)\ \ldots\ Y_{l,k}(N_{ant}-1)]^T$ represents a signal vector received from $N_{ant}$ antennas at subcarrier k and time slot l within the assigned bin; and $X_{m,l,k}$ indicates a training symbol at subcarrier k and time slot l, which has been already known to the base station reception end, as an output of the training symbol generator 214 for the mth terminal. And, $(\circ)^H$ is Hermitian transpose and $(\circ)^{19}$ implies a complex conjugate.

That is to say, as defined in Eq. (1), the carrier frequency offset estimating step S402 using the training symbols in the frequency domain derives a cross correlation vector of each subcarrier by multiplying the training symbols in the frequency domain that are obtained by carrying out an FFT algorithm with respect to training symbols in the time domain received via multiple antennas (smart antennas) during the training symbol transmission interval by the training symbols already known to the base station. Subsequently, the process computes an average during the training symbol transmission interval by doing an internal operation of the cross correlation vectors with respect to same subcarriers during two timeslots, and then estimates the carrier frequency offsets of each terminal based on phase information of the average.

The carrier frequency offset estimation technique using Eq. (1) above can estimate carrier frequency offsets of a desired terminal, without any interference by signals transmitted from a multiplicity of terminals with different carrier frequency offsets, even in SDMA where the terminals transmit signals via a same bin. Namely, in SDMA that allows the terminals to transmit signals to the base station via a same band, the carrier frequency offsets of each terminal adopting the same band can be estimated by using the scheme of Eq. (1). To help understand Eq. (1) above, there will be described with reference to Eqs. (2) to (4) below.

Eq. (2) below represents a signal vector in the frequency domain received at an antenna arrangement when a carrier frequency offset $\epsilon^m$ exists between the base station and the mth terminal.

$$Y_{m,l,k} = a(\theta_m)X_{m,l,k}H_{m,l,k}\frac{\sin(\varepsilon_m\pi)}{N\sin(\varepsilon_m\pi/N)}e^{jG_m\pi\frac{N-1}{N}}e^{j2\pi\left(\frac{N+N_G}{N}\right)\varepsilon_m l} + I_{m,l,k} + W_{m,l,k} \quad \text{Eq. (2)}$$

where $$I_{m,l,k} = a(\theta_m)\sum_{\substack{z=0 \\ z\neq k}}^{N-1} X_{m,l,z}H_{m,l,z}\frac{\sin[\pi(z-k+\varepsilon_m)]}{N\sin[\pi(z-k+\varepsilon_m)/N]}e^{j2(z-k+\varepsilon_m)\frac{N-1}{N}}$$

Further, $Y_{m,l,k}=[Y_{m,l,k}(0)Y_{m,l,k}(1)\ \ldots\ Y_{m,l,k}(N_{ant}-1)]^T$ represents a signal vector of the mth terminal received by $N_{ant}$ antennas at subcarrier k and time slot l within a bin identically assigned to a plurality of terminals; and is defined as $Y_{l,k}=Y_{0,l,k}+Y_{1,l,k}+\ldots+Y_{M-1,l,k}$ when M terminals are within a cell. And, $$a(\theta_m) = \left[1,\ e^{-j\frac{2\pi}{\lambda}d\sin\theta_m},\ \ldots,\ e^{-j\frac{2\pi}{\lambda}(N_{ant}-1)d\sin\theta_m}\right]$$

is a steering vector when a wavelength of a used carrier is λ, a distance between antennas is d, and an incidence angle of the mth terminal is $\theta_m$ with respect to an antenna arrangement. $W_{m,l,k}=[W_{m,l,k}(0)W_{m,l,k}(1)\ \ldots\ W_{m,l,k}(N_{ant}-1)]^T$ is a noise vector received at antenna, and $H_{m,l,k}$ indicates a channel that is experienced by a transmission signal of the mth terminal at subcarrier k and time slot l. At this time, since the distance d between the antennas is relatively short in the smart antenna system, it is assumed that channels each antenna experiences are identical. As expressed in Eq. (2), in case where a carrier frequency offset exists between the base station and a terminal, a received signal in the frequency domain is affected by an attenuation of signal magnitude, a phase rotation, and interference between subcarriers. Eq. (3) below shows signals in the frequency domain received by the base station in SDMA. A plurality of terminals with different carrier frequency offsets transmit signals via a same band, and the base station received signal may be obtained as a sum of the signals represented by Eq. (2) above.

$$Y_{l,k} = \sum_{m=0}^{M-1} Y_{m,l,k} \quad \text{Eq. (3)}$$

$$= \sum_{m=0}^{M-1} a(\theta_m) X_{m,l,k} H_{m,l,k} \frac{\sin(\varepsilon_m \pi)}{N \sin(\varepsilon_m \pi / N)} e^{j\varepsilon_m \pi \frac{N-1}{N}} e^{j2\pi\left(\frac{N+N_G}{N}\right)\varepsilon_m l} + I_{m,l,k} + W_{m,l,k}$$

$$= \sum_{m=0}^{M-1} a(\theta_m) X_{m,l,k} H_{m,l,k} \frac{\sin(\varepsilon_m \pi)}{N \sin(\varepsilon_m \pi / N)} e^{j\varepsilon_m \pi \frac{N-1}{N}} e^{j2\pi\left(\frac{N+N_G}{N}\right)\varepsilon_m l} + N_{m,l,k}$$

where $N_{m,l,k} = I_{m,l,k} + W_{m,l,k}$

For example, if it is assumed that the training symbol transmission interval is sufficiently great, i.e., if it is assumed that L and K are fully great, $$\sum_{l=0}^{L-2} \sum_{k=0}^{K-1} P_{m,l,k}^{H} \cdot P_{m,l+1,k}$$

in Eq. (1) above may be approximated as $E[P_{m,l,k}^{H} \cdot P_{m,l+1,k}]$. $E[P_{m,l,k}^{H} \cdot P_{m,l+1,k}]$, which is approximated from $$\sum_{l=0}^{L-2} \sum_{k=0}^{K-1} P_{m,l,k}^{H} \cdot P_{m,l+1,k}$$

of Eq. (1) for carrier frequency offset estimation of a terminal where $m=\tilde{m}$ in SDMA, may be represented as:

$$= E\left[\left(X_{m,l,k}^{*} \cdot \sum_{m=0}^{M-1} Y_{m,l,k}\right)^{H} \cdot \left(X_{m,l,k}^{*} \cdot \sum_{m=0}^{M-1} Y_{m,l+1,k}\right)\right] \quad \text{Eq. (4)}$$

$$= E\left[(X_{m,l,k}^{*} \cdot Y_{m,l,k})^{H} \cdot (X_{m,l,k}^{*} \cdot Y_{m,l+1,k}) + \left(X_{m,l,k}^{*} \cdot \sum_{\substack{m=0 \\ M/M}}^{M-1} Y_{m,l,k}\right)^{H} \cdot \left(X_{m,l,k}^{*} \cdot \sum_{\substack{m=0 \\ M/M}}^{M-1} Y_{m,l+1,k}\right)\right]$$

$$= E\left[\left(a(\theta_m) \cdot |X_{m,l,k}|^2 \cdot H_{m,l,k} \cdot \frac{\sin(\varepsilon_m \pi)}{N\sin(\varepsilon_m \pi / N)} \cdot e^{l\varepsilon_m \frac{N-1}{N}} \cdot e^{l2\pi\left(\frac{N+N_G}{N}\right)\varepsilon_\pi l} + X_{m,l+1,k}^{*} \cdot N_{m,l,k}\right)^{H} \cdot \right.$$

$$\left(a(\theta_m) \cdot |Xm, l+1, k|^2 \cdot H_{m,l+1,k} \cdot \frac{\sin(\varepsilon_m \pi)}{N\sin(\varepsilon_m \pi / N)} \cdot e^{l\varepsilon_m \frac{N-1}{N}} \cdot e^{l2\pi\left(\frac{N+N_G}{N}\right)\varepsilon_\pi l} + X_{m,l+1,k}^{*} \cdot N_{m,l,k}\right) +$$

$$\left(\sum_{\substack{m=0 \\ m\neq \tilde{m}}}^{M-1} a(\theta_m) \cdot X_{m,l,k}^{*} \cdot X_{m,l,k} \cdot H_{m,l,k} \cdot \frac{\sin(\varepsilon_m \pi)}{N\sin(\varepsilon_m \pi / N)} \cdot e^{l\varepsilon_m \frac{N-1}{N}} \cdot e^{l2\pi\left(\frac{N+N_G}{N}\right)\varepsilon_\pi l} + X_{m,l+1,k}^{*} \cdot N_{m,l,k}\right) \cdot$$

$$\left.\left(\sum_{\substack{m=0 \\ m\neq \tilde{m}}}^{M-1} a(\theta_m) \cdot X_{m,l,k}^{*} \cdot X_{m,l,k} \cdot H_{m,l,k} \cdot \frac{\sin(\varepsilon_m \pi)}{N\sin(\varepsilon_m \pi / N)} \cdot e^{l\varepsilon_m \frac{N-1}{N}} \cdot e^{l2\pi\left(\frac{N+N_G}{N}\right)\varepsilon_\pi (l+1)} + X_{m,l+1,k}^{*} \cdot N_{m,l,k}\right)\right]$$

$$= E\left[N_{a\pi l} \cdot |H_{m,l,k}|^2 \cdot \left(\frac{\sin(\varepsilon_m \pi)}{N\sin(\varepsilon_m \pi / N)}\right)^2 \cdot e^{l2\pi\left(\frac{N+N_G}{N}\right)\varepsilon_\pi l} + (X_{m,l,k} \cdot X_{m,l+1,k}^{*} \cdot N_{m,l,k}^{H} \cdot N_{m,l,k}) + \right.$$

$$(X_{m,l+1,k}^{*} \cdot N_{m,l,k})^{H} \cdot \left(a(\theta_m) \cdot |X_{m,l,k}|^2 \cdot H_{m,l+1,k} \cdot \frac{\sin(\varepsilon_m \pi)}{N\sin(\varepsilon_m \pi / N)} \cdot e^{l\varepsilon_m \frac{N-1}{N}} \cdot e^{l2\pi\left(\frac{N+N_G}{N}\right)\varepsilon_\pi l(l+1)}\right) +$$

$$(X_{m,l+1,k}^{*} \cdot N_{m,l,k}) \cdot \left(a(\theta_m) \cdot |X_{m,l,k}|^2 \cdot H_{m,l+1,k} \cdot \frac{\sin(\varepsilon_m \pi)}{N\sin(\varepsilon_m \pi / N)} \cdot e^{l\varepsilon_m \frac{N-1}{N}} e^{l2\pi\left(\frac{N+N_G}{N}\right)\varepsilon_\pi l}\right)^{H} +$$

$$\sum_{\substack{m=0 \\ m\neq \tilde{m}}}^{M-1} a(\theta_m) \cdot X_{m,l,k}^{*} \cdot X_{m,l,k} \cdot H_{m,l,k} \cdot \frac{\sin(\varepsilon_m \pi)}{N\sin(\varepsilon_m \pi / N)} \cdot e^{l\varepsilon_m \frac{N-1}{N}} \cdot e^{l2\pi\left(\frac{N+N_G}{N}\right)\varepsilon_\pi l} + X_{m,l+1,k}^{*} \cdot N_{m,l,k} \cdot$$

$$\left.\left(\sum_{\substack{m=0 \\ m\neq \tilde{m}}}^{M-1} a(\theta_m) \cdot X_{m,l,k}^{*} \cdot X_{m,l,k} \cdot H_{m,l,k} \cdot \frac{\sin(\varepsilon_m \pi)}{N\sin(\varepsilon_m \pi / N)} \cdot e^{l\varepsilon_m \frac{N-1}{N}} \cdot e^{l2\pi\left(\frac{N+N_G}{N}\right)\varepsilon_\pi (l+1)} + X_{m,l+1,k}^{*} \cdot N_{m,l,k}\right)\right]$$

$$= N_{a\pi l} \cdot |H_{m,l,k}|^2 \cdot \left(\frac{\sin(\varepsilon_m \pi)}{N\sin(\varepsilon_m \pi / N)}\right)^2 \cdot e^{l2\pi\left(\frac{N+N_G}{N}\right)\varepsilon_\pi l}$$

Eq. (4) above is developed from the following assumptions. That is, it is first assumed that training symbols $X_{m,l,k}$, $X_{m,l,k}$ of two other terminals $m_1$, $m_2$ have characteristics of autocorrelation of $E[X_{m,l,k} \cdot X^*_{m,l,k}]=1$ and cross correlation of $E[X_{m,l,k} \cdot X^*_{m,l,k}]=0$, and $a(\theta_m)^H \cdot a(\theta_m)=N_{ant}$. Further, it is also assumed that multiple paths channels $H_{m,l,k}$ and $H_{m,l+l,k}$ between two adjacent slots are identical. According to Eq. (4) above, even in case where carrier frequency offsets exist in multiple terminal signals simultaneously received by the base station, the operation result of $$\sum_{l=0}^{L-2}\sum_{k=0}^{K-1} P_{m,l,k}^H \cdot P_{m,l+1,k}$$

in Eq. (1) above contains component of $\hat{m}$ th terminal signal and frequency component by correlation characteristic between training symbols. Accordingly, carrier frequency offsets of a desired terminal can be estimated without any interference by signals transmitted from other terminals via a same band.

On the other hand, the process of compensating the carrier frequency offsets involved in the stored training symbols at step S403 compensates, at the carrier frequency offset compensator 210, the carrier frequency offsets presenting in the training symbols in the time domain stored in the training symbol storage unit 209 using the carrier frequency offset $\hat{\epsilon}_m$ of the mth terminal estimated at step S402. The carrier frequency offset compensation may be done by the following equation 5:

$$y'_n = y_n \cdot e^{-j2\pi\hat{\epsilon}_m n/N} \qquad \text{Eq. (5)}$$

Wherein $y_n = [y_n(0) y_n(1) \ldots y_n(N_{ant}-1)]^T$ is a signal vector in the time domain received by $N_{ant}$ antennas at discrete time n, and $y_n' = [y_n'(0) y_n'(1) \ldots y_n'(N_{ant}-1)]^T$ represents the signal vector in the time domain obtained by compensating the carrier frequency offsets. In OFDMA or SDMA system that transmits signals from a plurality of terminals via a same band or different bands, the carrier frequency offset compensation method using Eq. (5) above removes the carrier frequency offsets presenting in the training symbols of the mth terminal but may increase a distortion of other terminal signals due to absence of orthogonality in the frequency domain after the FFT algorithm. However, Minimum Mean Square Error (MMSE) based antenna weight vector estimation may form null beam regardless of noise and distortion of interference signal; and therefore, the interference signal with different carrier frequency offset can be removed through such antenna weight vector estimation.

In the meantime, the carrier frequency offset compensating step S403 may conduct in the frequency domain where the FFT algorithm is performed, rather than in the time domain, according to its implementation method. However, upon presence of carrier frequency offset, the signal in the frequency domain of the OFDMA system has interference between subcarriers due to lack of orthogonality therebetween, and also has a low signal to noise ratio (SNR). This causes a deterioration of beamforming performance. Since, however, the carrier frequency offset compensation technique in the frequency domain cannot remove the interference between subcarriers, the present invention compensates the carrier frequency offsets in the time domain.

Further, in case where the carrier frequency offset compensating step S403 makes use of SDMA to increase the transmission capacity, compensating the estimated carrier frequency offset $\hat{\epsilon}_m$ of the mth terminal may increase carrier frequency offsets presenting in signals transmitted from other terminals, but does not affect the performance by removing the signals from the other terminals by forming null beam in the frequency domain after that.

On the other hand, the antenna weight vector estimating steps S404 and S405, using the training symbols in the frequency domain obtained by performing the FFT algorithm with respect to the training symbols in the time domain derived by compensating the carrier frequency offsets, may compute an antenna vector weight $w_m$ for the mth terminal of the following equation 8 based on autocorrelation matrix R of the following equation 6, and cross correlation vector $P_m$ of the following equation 7 under the MMSE technique, with respect to a bin assigned to the terminal.

$$R = E[Y_{l,k}' Y_{l,k}'^H] \qquad \text{Eq. (6)}$$

$$P_m = E[X^*_{m,l,k} \cdot Y_{l,k}'] \qquad \text{Eq. (7)}$$

$$w_m = R^{-1} P_m \qquad \text{Eq. (8)}$$

Wherein $E[\circ]$ represents an expected value at time slot 1 during bin region and subcarrier index k within bin assigned for estimation of the antenna weight vector. And, $Y_{l,k}'$ is given by $Y_{l,k}' = [Y_{l,k}'(0) Y_{l,k}'(1) \ldots Y_{l,k}'(N_{ant}-1)]^T$ as a received signal vector in the frequency domain at lth time slot and kth subcarrier index, which is obtained by compensating the carrier frequency offsets and then carrying out the FFT algorithm.

In the meantime, in computing the antennal vector weight $w_m$, it will be apparent that the present invention may employ adaptive algorithms such as Least Mean Square (LMS) algorithm, Recursive Least Square (RLS) algorithm, etc., in addition to the technique of computing it directly, as in Eq. (8) above, and also may use other techniques instead of the MMSE technique.

Figure 5A:
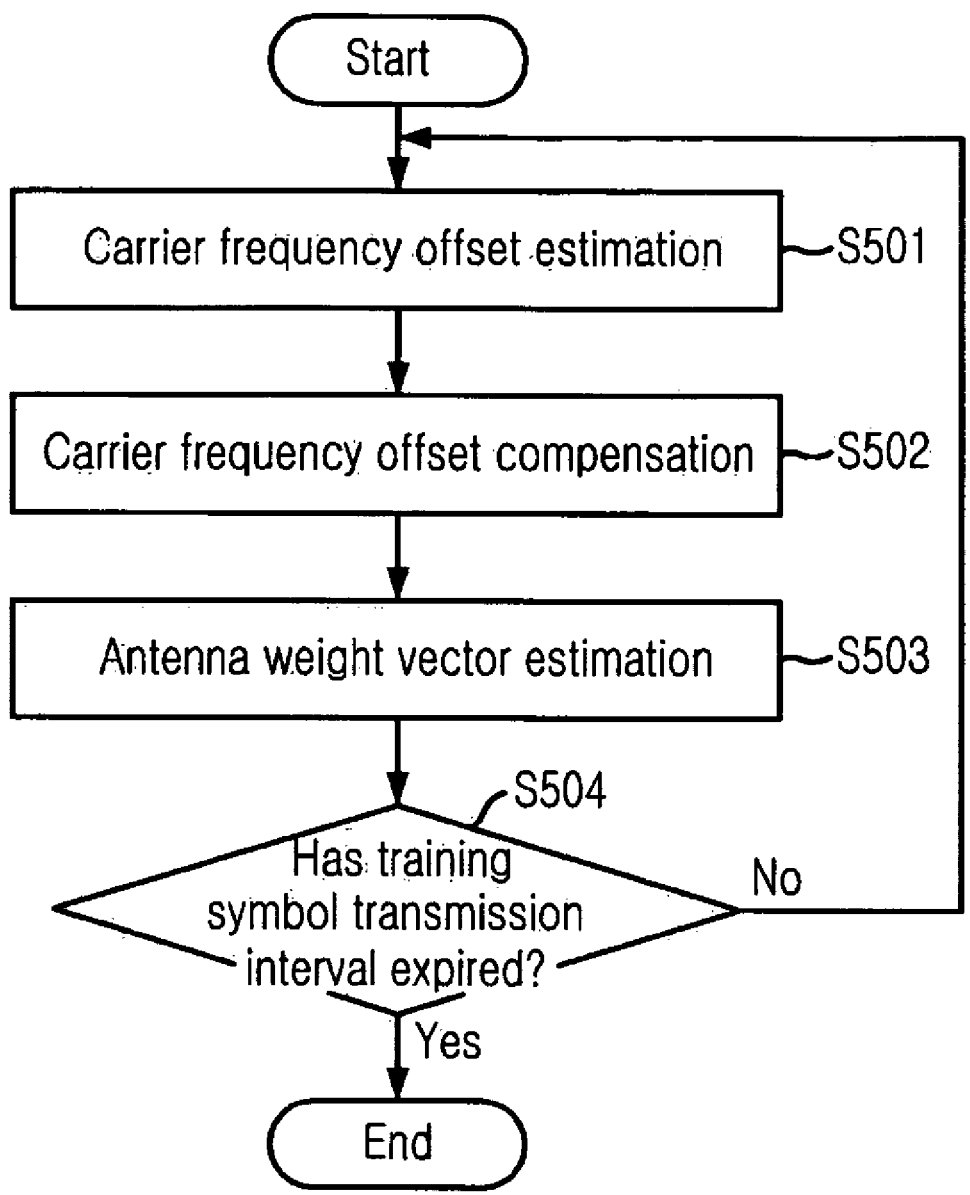
FIG. 5a is a flowchart illustrating a method for uplink carrier frequency synchronization and antenna weight vector estimation in an OFDMA system having a smart antenna in accordance with another embodiment of the present invention.

FIG. 5a is a flowchart illustrating a method for uplink carrier frequency synchronization and antenna weight vector estimation in an OFDMA system having a smart antenna in accordance with another embodiment of the present invention. This shows an example of implementing the same using a less calculation amount and memory size than those of the implementation example of FIG. 4a.

Figure 5B:
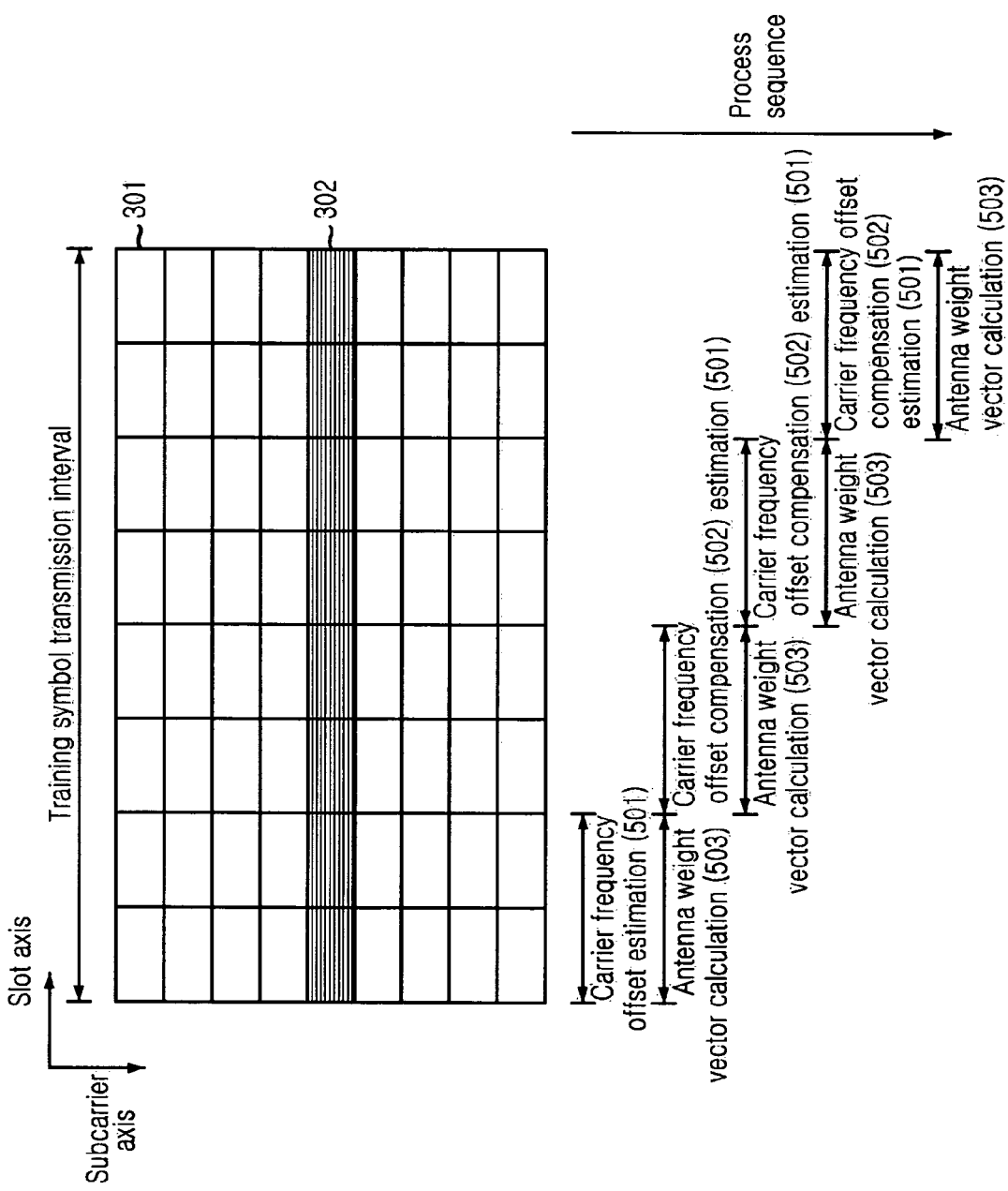
FIG. 5b is a view illustrating an example of a process sequence of a method for uplink carrier frequency synchronization and antenna weight vector estimation in an OFDMA system having a smart antenna in accordance with another embodiment of the present invention.

FIG. 5b is a view for explaining an example of a process sequence of a method for uplink carrier frequency synchronization and antenna weight vector estimation in an OFDMA having a smart antenna in accordance with another embodiment of the present invention.

Specifically, at step S501, the base station first estimates carrier frequency offsets using training symbols in the frequency domain obtained by applying an FFT algorithm with respect to training symbols received during two slots within a training symbol transmission interval.

Thereafter, the process of the invention compensates, at step S502, carrier frequency offsets of training symbols in the time domain received after the two slots on the basis of the estimated carrier frequency offsets.

At a next step S503, the process calculates an antenna weight vector using the training symbols in the frequency domain made by effecting the FFT algorithm with respect to the training symbol in the time domain derived from the compensation of the carrier frequency offsets.

Subsequently, the inventive process repeatedly performs, at step S504, steps S501 to S503 above during the transmission of the training symbols.

Hereinafter, an embodiment of each step above will be provided more concretely.

First of all, the carrier frequency offset estimating step S501 using the training symbols in the frequency domain estimates the carrier frequency offsets with respect to the training symbols in the frequency domain that are obtained by performing, at the FFT unit 211, the FFT algorithm with respect to the training symbols in the time domain received during two slots within the training symbol transmission interval, and the already-known training symbols through the following equation 9:

$$\hat{\varepsilon}_m = \frac{1}{2\pi(1+N_G/N)} \arg\left(\sum_{k=0}^{K-1} P_{m,l,k}^H \cdot P_{m,l+1,k}\right) \quad \text{Eq. (9)}$$

That is to say, the carrier frequency offset estimating step S501 using the training symbols in the frequency domain derives a cross correlation vector of each subcarrier by multiplying the training symbols in the frequency domain that are obtained by taking the FFT algorithm with respect to the training symbols in the time domain received via the smart antenna during the two slots by the training symbols already known to the base station. Subsequently, the process computes an average during the two slots by performing an internal operation of the cross correlation vector with respect to same subcarriers of the two slots, and then estimates the carrier frequency offsets of each terminal based on phase information of the average.

Further, the carrier frequency offset compensating step S502 for the training symbols in the time domain compensates, at the carrier frequency offset compensator 210, the carrier frequency offsets presenting in the training symbols in the time domain received after the two slots using the estimated carrier frequency offset $\hat{\varepsilon}_m$ of the mth terminal. The carrier frequency offset compensation may be done by Eq. (5) above.

In the SDMA system that transmits signals from a plurality of terminals to the base station via a same band, it is implemented in such a manner that carrier frequency offsets presenting in training symbols in the time domain received after the two slots are compensated in the time domain by using estimated carrier frequency offsets of each terminal, and interference signal of the terminals with different carrier frequency offsets is removed by forming null beam through the estimated antenna weight vector using the training symbols in the frequency domain that are obtained by compensating the carrier frequency offsets and then effecting FFT algorithm.

Further, the antenna weight vector calculating step S503 using the training symbols in the frequency domain may calculate the antenna weight vector by using Eqs. (6) to (8) above.

As set forth above, the method for uplink carrier frequency synchronization and antenna weight vector estimation in accordance with one embodiment of the present invention, as shown in FIGS. 4a and 4b, estimates the carrier frequency offsets using all the training symbols in the frequency domain received during the training symbol transmission interval and at the same time stores all the received training symbols, compensates the carrier frequency offsets presenting in the stored training symbols using the estimated carrier frequency offset $\hat{\varepsilon}_m$, and calculates the antenna weight vector.

In the meantime, the method for uplink carrier frequency synchronization and antenna weight vector estimation in accordance with another embodiment of the present invention, as shown in FIGS. 5a and 5b, estimates the carrier frequency offsets using the training symbols in the frequency domain transmitted during adjacent two slots, compensates, without storing such training symbols, the carrier frequency offsets with respect to the training symbols received after the two slots using the estimated carrier frequency offset $\hat{\varepsilon}_m$, and calculates the antenna weight vector through the repeated carrier frequency offset estimating and compensating processes.

The present invention may be implemented in such a way that each of those methods is applied to elements such as the carrier frequency offset estimator 212, the carrier frequency offset compensator 210, the training symbol storage unit 209, the FFT unit 211, the antenna weight vector calculator 213, etc.

Figure 6A:
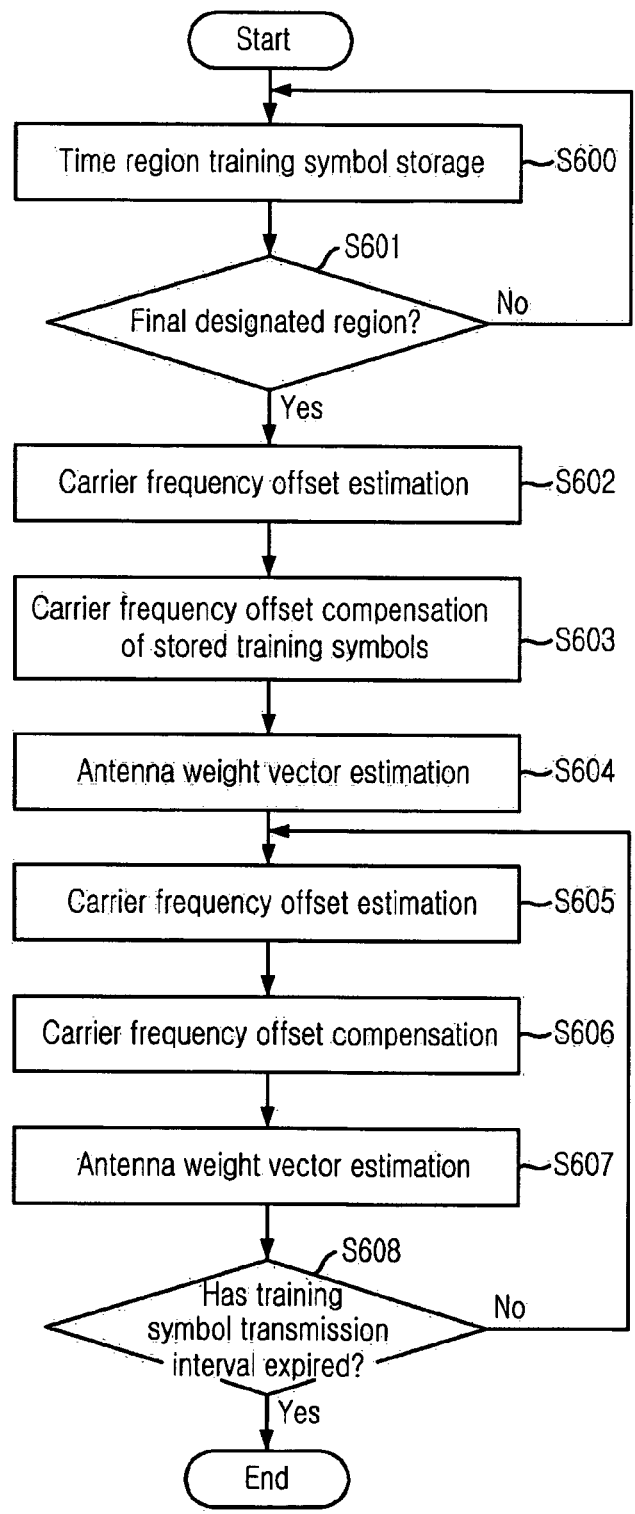
FIG. 6a is a flowchart illustrating a method for uplink carrier frequency synchronization and antenna weight vector estimation in an OFDMA system having a smart antenna in accordance with another embodiment of the present invention.
Figure 6B:
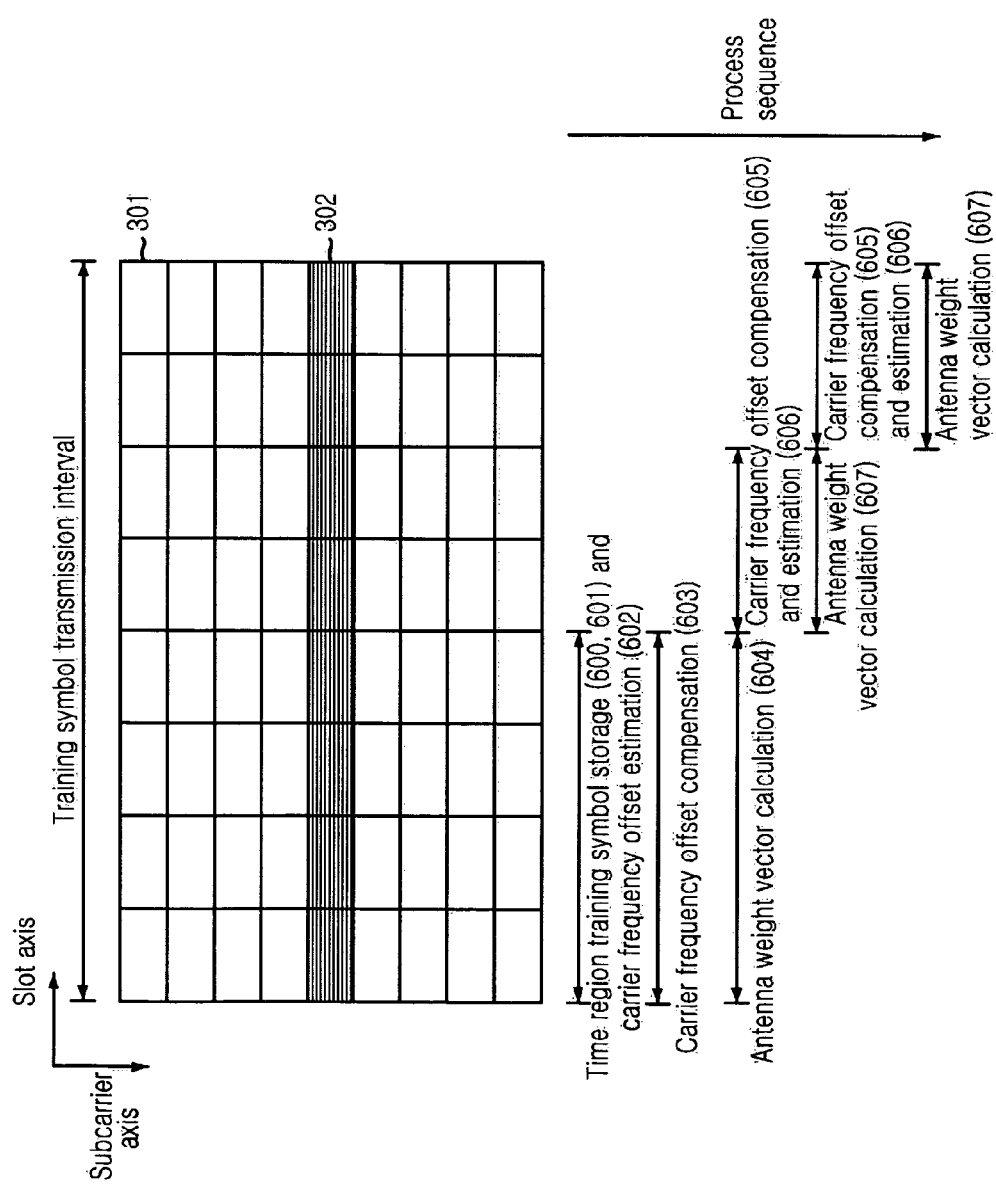
FIG. 6b is a view illustrating an example of a process sequence of a method for uplink carrier frequency synchronization and antenna weight vector estimation in an OFDMA system having a smart antenna in accordance with another embodiment of the present invention.

On the other hand, the present invention is not limited to the two methods as illustrated above, and various methods may be applicable depending on the required calculation amount and memory size. As illustrated in FIGS. 6a and 6b, a method for uplink carrier frequency synchronization and antenna weight vector estimation in accordance with still another embodiment of the present invention may estimate carrier frequency offsets using training symbols in the frequency domain received during designated sections within the whole training symbol transmission interval and at the same time stores training symbols in the time domain received during the same sections, and compensate carrier frequency offsets presenting in the stored training symbols using the estimated carrier frequency offset $\hat{\varepsilon}_m$. With respect to training symbols received after the sections, the method according to still another embodiment of the invention may perform the step of calculating the antenna weight vector while carrying out the carrier frequency offset estimating and compensating steps repeatedly, as in the method shown in FIGS. 5a and 5b. Details of this method will now be explained in detail with reference to FIGS. 6a and 6b.

FIG. 6a is a flowchart illustrating a method for uplink carrier frequency synchronization and antenna weight vector estimation in an OFDMA system having a smart antenna in accordance with still another embodiment of the present invention, and FIG. 6b is a view for explaining an example of a process sequence of a method for uplink carrier frequency synchronization and antenna weight vector estimation in an OFDMA system having a smart antenna in accordance with still another embodiment of the present invention.

As shown in FIG. 6a, the present invention carries out steps S600 to S604 during a portion of a training symbol transmission interval with a plurality of time slots and bins, with respect to training symbols transmitted to compute an antenna weight vector during the interval, while doing the following steps S605 to S608 with respect to the residual training symbol transmission interval.

At first, at steps S600 and S601, the base station receives and stores, during a designated training symbol transmission interval, training symbols in the time domain transmitted from a terminal to calculate an antenna weight vector.

At a subsequent step S602, the inventive process estimates carrier frequency offsets using training symbols in the frequency domain that are obtained by performing FFT algorithm with respect to signals received during the designated training symbol transmission interval. In other words, the process estimates carrier frequency offsets using training symbols in the frequency domain that are derived by applying the FFT algorithm with respect to training symbols in the time domain transmitted from a terminal during the designated training symbol transmission interval.

Thereafter, the process compensates, in the time domain, carrier frequency offsets, which exist in the stored training symbols in the time domain. Namely, the process compensates, at step S603, the carrier frequency offsets of the stored training symbols in the time domain using the estimated carrier frequency offsets. More specifically, the process compensates, in the time domain, the carrier frequency offsets, which present in the training symbols in the time domain stored in the training symbol offset storage unit 209 using the estimated carrier frequency offsets.

At a following step S604, the process estimates an antenna weight vector using the training symbols in the frequency domain that are derived by carrying out the FFT algorithm with respect to the training symbols in the time domain obtained by compensating the carrier frequency offsets.

Next, at step S605, the process estimates the carrier frequency offsets using the training symbols in the frequency domain that are obtained by performing the FFT algorithm with respect to the training symbols received during two slots within the training symbol transmission interval.

At step S606, the process compensates the carrier frequency offsets of the training symbols in the time domain received after the two slots using the estimated carrier frequency offsets.

At a next step S607, the process estimates the antenna weight vector using the training symbols in the frequency domain that are derived by carrying out the FFT algorithm with respect to the training symbols in the time domain obtained by compensating the carrier frequency offsets.

At a final step S608, the process repeatedly performs steps S605 to S607 above during the transmission of the training symbols.

A concrete embodiment of each step set forth above is already described in detail referring to FIGS. 4 and 5; and therefore, details thereof are omitted for the sake of brevity.

As mentioned above, the present invention has advantages in that it can achieve a rapid carrier frequency synchronization between a terminal and a base station, without requiring additional bandwidth, using training symbols transmitted to estimate an antenna weight vector without transmission of extra periodic synchronization symbol in an OFDMA system having smart antenna, and also prevent the deterioration of performance caused by carrier frequency offsets in the process of estimating the antenna weight vector.

Moreover, the present invention can estimate and compensate carrier frequency offsets with respect to a desired terminal without influence of carrier frequency offsets of other terminals, and estimate an antenna weight vector, even in case where an OFDMA system having a smart antenna makes use of SDMA to increase transmission capacity or a plurality of terminal with different carrier frequency offsets simultaneously transmit transmission symbols via a same band.

Namely, the invention can estimate and compensate carrier frequency offsets with respect to a desired terminal without influence of carrier frequency offsets of other terminals, and estimate an antenna weight vector, even in SDMA that transmits signals from the terminals via the same band to increase the transmission capacity.

The method of the present invention as mentioned above may be implemented by a software program and stored in computer-readable storage medium such as CD-ROM, RAM, ROM, floppy disk, hard disk, optical magnetic disk, etc. This process may be readily carried out by those skilled in the art; and therefore, details of thereof are omitted here.

The present application contains subject matter related to Korean patent application No. 2005-24801 filed with the Korean Intellectual Property Office on Mar. 25, 2005, the entire contents of which are incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A computer-readable medium used in association with a computing device which includes a processor and a memory, the computer readable medium including computer instructions which are configured to cause the computing device to perform a method for uplink carrier frequency synchronization and antenna weight vector estimation in an Orthogonal Frequency Division Multiple Access (OFDMA) system having a smart antenna, the method comprising:

receiving and storing training symbols in the time domain transmitted to estimate an antenna weight vector during a training symbol transmission interval, wherein the estimated antenna weight vector is generated during the training symbol transmission interval of the received training symbols;

estimating carrier frequency offsets using training symbols in the frequency domain that are obtained by performing a Fast Fourier Transformation (FFT) algorithm with respect to the training symbols received during the training symbol transmission interval;

compensating the stored training symbols in the time domain based on the estimated carrier frequency offsets; and estimating the antenna weight vector using training symbols in the frequency domain that are obtained by applying an FFT algorithm with respect to the training symbols in the time domain derived by compensating the carrier frequency offsets during the training symbol transmission interval, wherein the estimating carrier frequency offsets are provided to the compensating training symbols in the time domain prior to the estimating the antenna weight vector and during the training symbol transmission interval.

2. The computer-readable medium as recited in claim 1, wherein the estimating carrier frequency offsets using training symbols in the frequency domain multiplies the training symbols in the frequency domain that are obtained by performing the FFT algorithm with respect to the training symbols received via the smart antenna by training symbols that are known to a base station to derive a cross correlation vector of each subcarrier, performs an internal operation of the cross correlation vector with respect to same subcarriers for two slots to compute an average value during the training symbol transmission interval, and estimates carrier frequency offsets of each terminal using phase information of the computed average value.

3. The computer-readable medium as recited in claim 1, wherein the receiving and storing training symbols in the time domain transmitted to estimate the antenna weight vector during the training symbol transmission interval allows the base station to receive and store the training symbols in the time domain transmitted from the terminal during the training symbol transmission interval having a plurality of timeslots and bins via the smart antenna to thereby estimate the antenna weight vector during the training symbol transmission interval.

4. The computer-readable medium as recited in claim 1, wherein the compensating the stored training symbols in the time domain based on the estimated carrier frequency offsets compensates, in the time domain, the carrier frequency offsets presenting in the training symbols in the time domain stored in a training symbol storage unit based on the estimated carrier frequency offsets.

5. The computer-readable medium as recited in claim 1, wherein, in a space division multiple access (SDMA) that transmits signals from a plurality of terminals to the base station via a same band, the compensating the stored training symbols in the time domain based on the estimated carrier frequency offsets and the estimating carrier frequency offsets using training symbols in the frequency domain compensate, in the time domain, carrier frequency offsets exiting in the stored training symbols in the time domain using the estimated carrier frequency offsets of each terminal, and remove interference signal of the terminals having different carrier frequency offsets by forming null beam through the estimated antenna weight vector using the training symbols in the frequency domain that are derived by compensating the carrier frequency offsets and then performing the FFT algorithm.

6. A computer-readable medium used in association with a computing device which includes a processor and a memory, the computer readable medium including computer instructions which are configured to cause the computing device to perform a method for uplink carrier frequency synchronization and antenna weight vector estimation in an OFDMA system having a smart antenna, the method comprising:

estimating carrier frequency offsets using training symbols in the frequency domain that are obtained by applying an FFT algorithm with respect to training symbols received during two slots within a training symbol transmission interval, wherein the training symbols used for the estimated carrier frequency offsets are generated during the two slots of the training symbol transmission;

compensating carrier frequency offsets of training symbols in the time domain received after the two slots based on the estimated carrier frequency offsets;

estimating an antenna weight vector using the training symbols in the frequency domain that are obtained by performing an FFT algorithm with respect to training symbols in the time domain derived by compensating the carrier frequency offsets; and repeatedly performing the estimating carrier frequency offsets using training symbols in the frequency domain that are obtained by applying the FFT algorithm with respect to training symbols received during two slots within the training symbol transmission interval, the compensating carrier frequency offsets of training symbols in the time domain received after the two slots based on the estimated carrier frequency offsets, and estimating the antenna weight vector using the training symbols in the frequency domain that are obtained by performing an FFT algorithm with respect to training symbols in the time domain derived by compensating the carrier frequency offsets during the transmission of the training symbols.

7. The computer-readable medium as recited in claim 6, wherein the estimating carrier frequency offsets using training symbols in the frequency domain that are obtained by applying the FFT algorithm with respect to training symbols received during two slots within the training symbol transmission interval multiplies the training symbols in the frequency domain that are obtained by taking the FFT algorithm with respect to the training symbols received during the two slots through the smart antenna by training symbols that are known by a base station to derive a cross correlation vector of each subcarrier, performs an internal operation of the cross correlation vector with respect to same subcarriers for the two slots to compute an average value during the two slots, and estimates carrier frequency offsets of each terminal using phase information of the computed average value.

8. The computer-readable medium as recited in claim 6, wherein, in a SDMA that transmits signals from a plurality of terminals to the base station via a same band, said the compensating carrier frequency offsets of training symbols in the time domain received after the two slots based on the estimated carrier frequency offsets, and the estimating an antenna weight vector using the training symbols in the frequency domain that are obtained by performing an FFT algorithm with respect to training symbols the time domain derived by compensating the carrier frequency offsets compensates, in the time domain, carrier frequency offsets exiting in the training symbols in the time domain transmitted after the two slots using the estimated carrier frequency offsets of each terminal, and remove interference signal of the terminals having different carrier frequency offsets by forming null beam through the estimated antenna weight vector using the training symbols in the frequency domain that are derived by compensating the carrier frequency offsets and then performing the FFT algorithm.

9. A computer-readable medium used in association with a computing device which includes a processor and a memory, the computer readable medium including computer instructions which are configured to cause the computing device to perform a method for uplink carrier frequency synchronization and antenna weight vector estimation in an OFDMA system having a smart antenna, the method comprising:

receiving and storing training symbols in the time domain transmitted to estimate an antenna weight vector during a part of a training symbol transmission interval, wherein the estimated antenna weight vector is generated during the training symbol transmission interval of the received training symbols;

estimating carrier frequency offsets using training symbols in the frequency domain that are obtained by performing an FFT algorithm with respect to the training symbols received during the part of training symbol transmission interval;

compensating carrier frequency offsets of the stored training symbols in the time domain based on the carrier frequency offsets estimated at the estimating carrier frequency offsets using training symbols in the frequency domain that are obtained by performing an FFT algorithm with respect to the training symbols received during the part of training symbol transmission interval;

estimating the antenna weight vector using training symbols in the frequency domain that are obtained by using an FFT algorithm with respect to the training symbols in the time domain derived by compensating the carrier frequency offsets at the compensating carrier frequency offsets of the stored training symbols in the time domain based on the carrier frequency offsets during the part of training symbol transmission interval;

estimating carrier frequency offsets using training symbols in the frequency domain that are obtained by performing an FFT algorithm with respect to training symbols received during two slots within the training symbol transmission interval;

compensating carrier frequency offsets of training symbols in the time domain received after the two slots based on the carrier frequency offsets estimated at the estimating carrier frequency offsets using training symbols in the frequency domain;

estimating the antenna weight vector using training symbols in the frequency domain that are obtained by carrying out an FFT algorithm with respect to the training symbols in the time domain compensated at the compensating carrier frequency offsets of training symbols in the time domain received after the two slots based on the carrier frequency offsets; and repeatedly performing the estimating carrier frequency offsets using training symbols in the frequency domain, the compensating carrier frequency offsets of training symbols in the time domain received after the two slots, and the estimating the antenna weight vector using training symbols in the frequency domain during the residual training symbol transmission interval.

\* \* \* \* \*